No. 885,336. PATENTED APR. 21, 1908.
W. E. GARVEY.
TIRE CUSHION FOR VEHICLES.
APPLICATION FILED JUNE 4, 1907.

Inventor
William E. Garvey

Witnesses
Edwin L Bradford
Anne B. Johnson

By Johnson & Johnson

Attorneys

UNITED STATES PATENT OFFICE.

WILLIAM E. GARVEY, OF CLEVELAND, OHIO.

TIRE-CUSHION FOR VEHICLES.

No. 885,336.   Specification of Letters Patent.   Patented April 21, 1908.

Application filed June 4, 1907. Serial No. 377,136.

*To all whom it may concern:*

Be it known that I, WILLIAM E. GARVEY, a citizen of the United States, residing at Cleveland, in the county of Cuyahoga and State of Ohio, have invented certain new and useful Improvements in Tire-Cushions for Vehicles; and I do hereby declare the following to be a full, clear, and exact description of the invention, such as will enable others skilled in the art to which it appertains to make and use the same.

For automobile tires I have produced a cushion filling in which a rope core has been found to give an efficient cushion foundation for a wound cushion of lighter and more elastic substance such as yarn which in fact forms the cushion and as a filling for a clencher rubber casing, takes the place of the air tube and forms a support for the rubber tire. The two yielding bodies thus wound one upon the other, the outer one of yarn having the greater cushioning action and being wound upon a less resilient core of rope which is harder than yarn, have the effect of causing the spring or cushion action of the yarn winding, when under pressure, against the rubber tire and thereby giving it the desired cushioning action. While the rope core gives a yielding support for the yarn windings it has the advantage of preventing the cutting and wearing of the yarn strands and causes the cushioning action of the yarn body in the seating of the split base of the rubber tire or casing, to give the full cushioning effect to the tread of the latter and form by the separate windings of different degrees of hardness, a yielding filling which will maintain its cushioning character in wearing out several rubber tires or casings.

Figure 1:
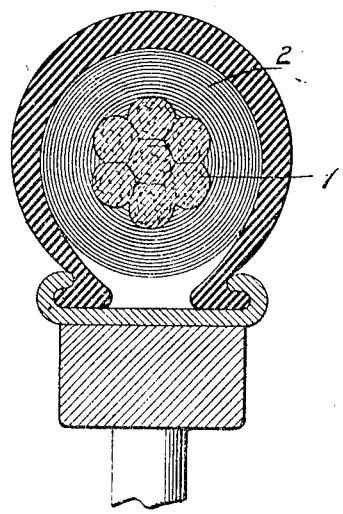
Figure 2:
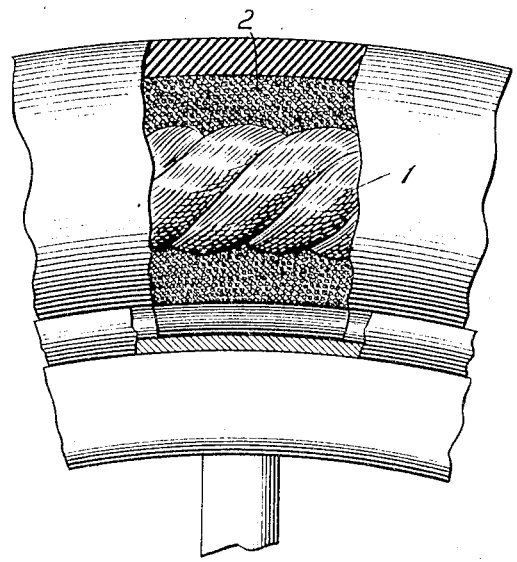
Figure 3:
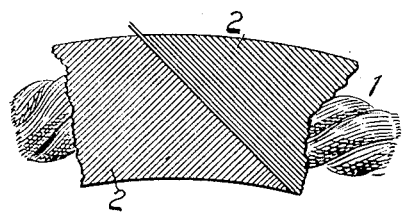

In the accompanying drawings I have shown in Figure 1 a transverse section of a rubber clencher tire filled with separate windings each having different cushioning capacities and comprising a rope and a yarn winding thereon. Fig. 2 shows in sectional elevation a portion of a rubber tire showing my improved cushioning filling of rope and yarn wound thereon by a single strand. Fig. 3 shows a portion of the wound tire filling in which I prefer that the yarn winding be made by a diagonal crossing of the strands upon the rope-core.

I use the well known clencher tire and clenching rim of the wheel because of the advantage it gives in applying my invention and in effecting the proper filling of a cushioning body so that it will have a compact fitting within and upon the inner walls of the rubber tire except at the base thereof, and because of the facility it affords for its removal and replacement by a new one upon the same wound filling.

In making the cushioning filling I take a piece of rope 1, and of a length sufficient to form when its ends are joined, a ring adapted to form a core within the rubber tire and for this purpose I prefer that the diameter of the rope shall be about half the inner diameter of the rubber tire or casing, and cause it to have a certain yielding or cushioning function. But the element which forms the filling and cushion proper for the tire is produced upon this rope core by winding thereon a body of yarn 2 until it makes a thickness sufficient to fill the rubber tire with a compact fitting and which can be determined by measurement of the wound body. The winding of the yarn should be compactly made and when fitted within the tire the latter acts as a binder for the twisted strands and has thereon a perfectly cushioned seating having its resiliency maintained by the coöperation of a rope core of greater density and less resilient function and which has the effect of keeping the yarn winding in active condition so that it will yield and expand with the cushioning action of the rubber tire. An automobile tire thus made while being of less cost is very much more durable than a pneumatic tire and gives to the wheel the desired spring action.

Referring to Fig. 1 it will be noted that the cylindrical body formed by the yarn winding has no support at the open or split base of the clencher tire but is free to be compressed within the space formed between the open clencher sides and the clencher part of the wheel-rim, so that the yielding of the tire under its tread-pressure will allow both the rope-core and its yarn winding to yield together and force that part of the yarn filling which crosses the split base between the horns of the tire into the space between its side horns and thus cause a durable and moderate yielding of the tire cushion as a body while at the same time allowing the tire to have the desired tread cushioning function. The advantage of this construction causes the yielding of the tread under pressure not merely to flatten that part of the cushion next to the tire tread but to force the cushion as an entirety against the inner walls of the base of the tire and hence into the space between its split base and in this way the resiliency of the cushion is rendered more durable.

I prefer to make the yarn winding of alternate layers in diagonal directions upon the core as it gives a better resilient action and has the effect of retaining its resilient character and filling function.

I claim:

1. A vehicle tire consisting of a rubber casing, a core of rope, and a winding thereon of a strand of yarn fitting and filling the rubber casing and forming a cushioning support therefor upon the rope-core.

2. A vehicle tire consisting of a casing, and a filling of separate and distinct fibrous bodies—an inner one of compactly twisted strands forming a rope-core, the outer winding being a strand wound of alternate layers in diagonal directions upon the core and having the greater resilient function, filling the casing and supporting it.

In testimony whereof I have signed my name to this specification in the presence of two subscribing witnesses.

WILLIAM E. GARVEY.

Witnesses:
W. J. ENGEL,
F. A. LEISENHEIMER.